A. W. BRINKERHOFF
Seed-Planter.
No. 23,896.  Patented May 10, 1859.
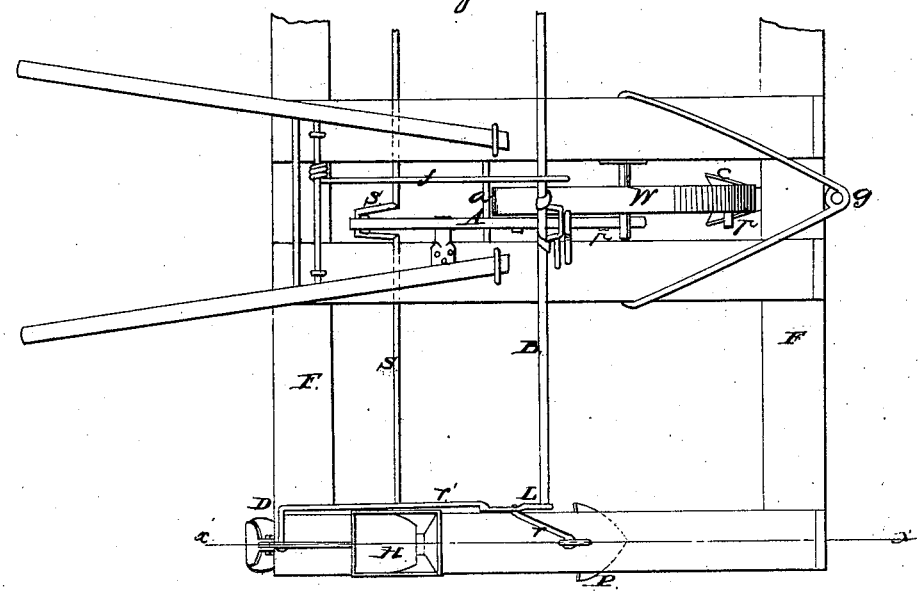
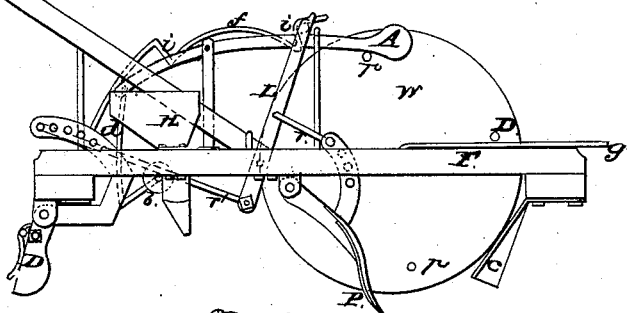
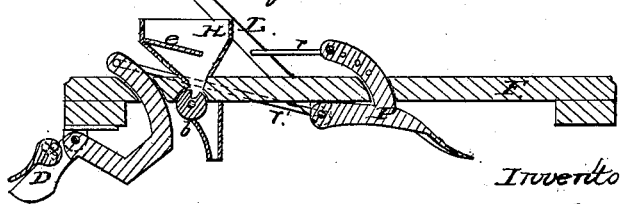

UNITED STATES PATENT OFFICE.

A. W. BRINKERHOFF, OF UPPER SANDUSKY, OHIO.

IMPROVEMENT IN CORN-PLANTERS.

Specification forming part of Letters Patent No. 23,896, dated May 10, 1859.

*To all whom it may concern:*

Be it known that I, A. W. BRINKERHOFF, of Upper Sandusky, in the county of Wyandot and State of Ohio, have invented a new and useful Improvement in Corn-Planters; and I do hereby declare that the following is a full, clear, and exact description of the same, reference being had to the annexed drawings, forming part of this specification, in the several figures of which similar characters of reference denote the same part.

Figure 1 is a top view of my improved seed-planter. Fig. 2 is a side view of the same. Fig. 3 is a vertical section on line $x\,x$, showing the position of the plow and coverer when drawn out of the way in turning, &c.

The nature of the invention consists in constructing the frame of the planter with a wheel in the center, having pins on the side, on which rests a weighted lever connected by a rod with a rock-shaft extending across the frame, to each end of which is attached the roller having a cavity, into which the seed is fed from the hopper above it, so that in the revolution of the wheel the weighted lever falls on the next pin and is raised by it and falls on the next, thus moving the rock-shaft, and, turning forward the roller, the grain is emptied into the furrow, and the roller then turns up again and receives the next grain, and so on. In front of the grain-hopper is the plow, connected by a rod with a lever, to which also is connected by a rod the coverer behind the hopper. There is also a connecting-bar from one lever to another across the frame, and a detent between the handles attached to the frame, having two catches, which hold the said connecting-bar in position either in or out of gear, so that by moving the bar into the last catch of the detent the plows and coverers are, by means of the levers to which they are attached, drawn up entirely out of the way in turning or going to and from the field, and the bar presses on the lever attached to the rock-shaft and raises it out of the way of the pins on the wheel, thus suspending the planting. The plow and coverers are adjustable to regulate the depth of plowing and covering, and the grain is fed into the roller from an inclined plate in the hopper, so as to prevent the pressure of the seed on the roller, as will be set forth.

In the drawings, F is the frame; W, the wheel; C, the clearer in front of the wheel, which removes any obstructions; $a$, the cleaner, which removes the dirt that may clog the wheel; $p$, the pins on which the weighted lever A rests; $d$, the rod connecting the weighted lever A with rock-shaft S, on either end of which shaft are the rollers $b$, with a cavity for holding the seed, as shown in Fig. 3.

H is the hopper above the roller, and $e$ the inclined plate in the hopper, from which the seed is fed into the roller.

P is the plow attached by rod $r$ to lever L, which is secured to the side of the frame, and to the lower end of which lever is the rod $r'$, by which the coverer D and lever L are connected. The plow and coverer can be adjusted to regulate the depth by moving rods $r\,r'$ into either of the other holes in their arms, and the back plate of the coverer can be adjusted by means of its several holes and screw-bolt $h$, so as to make it cover one, two, or three inches.

B is the connecting-bar between levers L L.

$f$ is the detent, having catches $i\,i$, to hold the bar B in position either in or out of gear, and $g$ is the draft-rod connected to the frame at the axis of wheel W.

The grain is fed into the roller $b$ under the hopper H from the inclined plate $e$. By the revolution of wheel W the weighted lever A is raised and lowered by pins $p$, and by its connection with rock-shaft S the shaft is moved and the roller $b$ on the end of it turned forward and the seed emptied into the furrow made by plow P, in front of it, and covered over by coverer D, following it. The plow P and coverer D, being connected to the frame by hinges, may be adjusted by moving rod $r\,r'$, connecting them to lever L, into either of the holes in their arms.

In turning the planter or going to and from the field, by pulling back the connecting-bar B into the last catch, $i'$, of the detent $f$, the plow P and coverer D are by means of lever L drawn up out of the way, and at the same time bar B presses on lever A and raises it above the pins on the wheel, and thus stops the planting process.

Having described my improvement, I claim—

The adjustable coverer D and opener P, as described, in combination with lever L, the weighted lever A operating the rollers and rod B, the whole being connected and operating substantially as described.

In testimony whereof I have hereunto signed my name before two subscribing witnesses.

A. W. BRINKERHOFF.

Witnesses:
 GEO. PATTEN,
 JOHN S. HOLLINGSHEAD.